Nov. 15, 1960 W. L. STOOTS, JR 2,960,321
PORTABLE AERATOR
Filed Sept. 6, 1957
2 Sheets-Sheet 1

INVENTOR.
William L. Stoots, Jr.

Nov. 15, 1960  W. L. STOOTS, JR  2,960,321
PORTABLE AERATOR

Filed Sept. 6, 1957  2 Sheets-Sheet 2

INVENTOR.
William L. Stoots, Jr.
BY Victor J. Evans &Co.
ATTORNEYS

United States Patent Office 2,960,321
Patented Nov. 15, 1960

2,960,321

PORTABLE AERATOR

William L. Stoots, Jr., 2562 Quail Ave., Memphis, Tenn.

Filed Sept. 6, 1957, Ser. No. 682,538

1 Claim. (Cl. 261—30)

This invention relates to an aerating device, and more particularly to a device for aerating a container of water such as water which has live bait for fish therein.

The object of the invention is to provide a portable aerator for supplying oxygen or air to a container such as a container containing live bait such as minnows therein whereby the minnows or bait will be kept alive for prolonged periods of time until the minnows or bait are to be used.

Another object of the invention is to provide a portable aerator which includes a housing that has a source of electrical energy therein and wherein the source of electrical energy may be batteries of conventional construction, the batteries serving to operate a small electric motor which is used for actuating a pump whereby air can be pumped into water which may be in a bucket, pail or other container so that minnows or other bait in the container will be kept alive by being supplied with the necessary quantity of oxygen or air, the portable aerator of the present invention being especially suitable for use by fishermen.

A further object of the invention is to provide a portable aerator which is extremely simple and inexpensive to manufacture.

Other objects and advantages will be apparent during the course of the following description.

In the accompanying drawings, forming a part of this application, and in which like numerals are used to designate like parts throughout the same.

Figure 5 is a perspective view illustrating a modification.

Figure 6 is a longitudinal sectional view taken through the modification of Figure 5.

Figure 1:
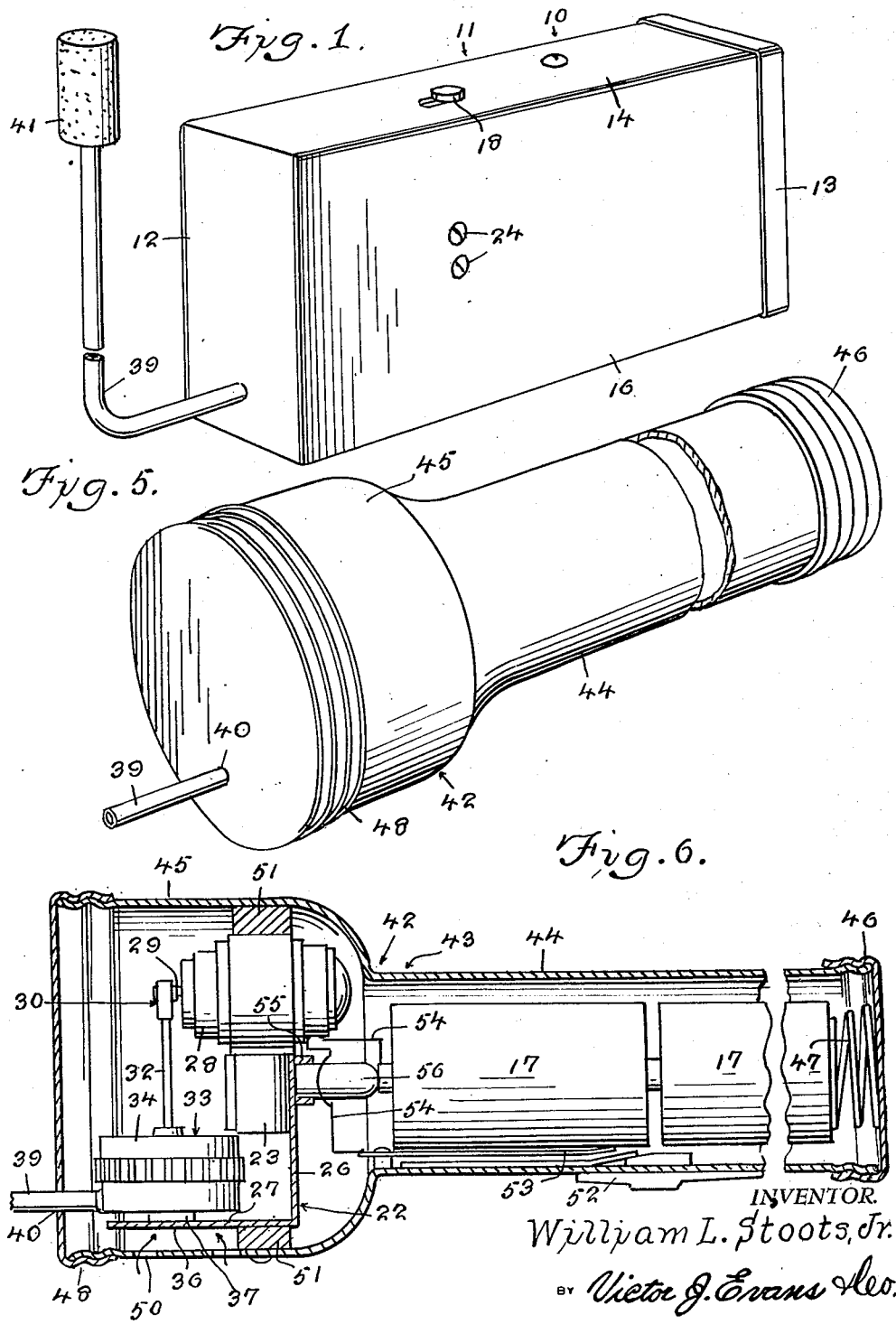
Figure 1 is a perspective view illustrating the portable aerator of the present invention.
Figure 2:
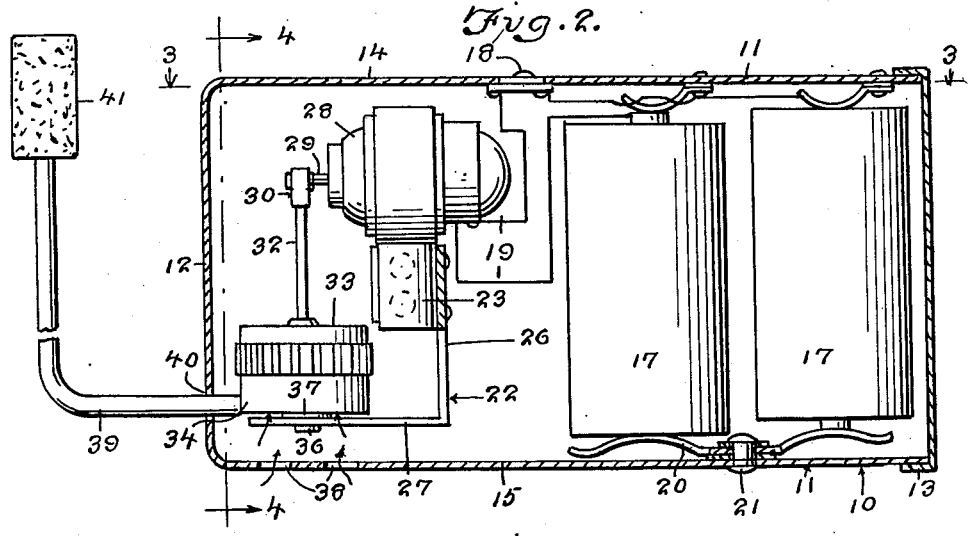
Figure 2 is a longitudinal sectional view taken through the portable aerator.
Figure 3:
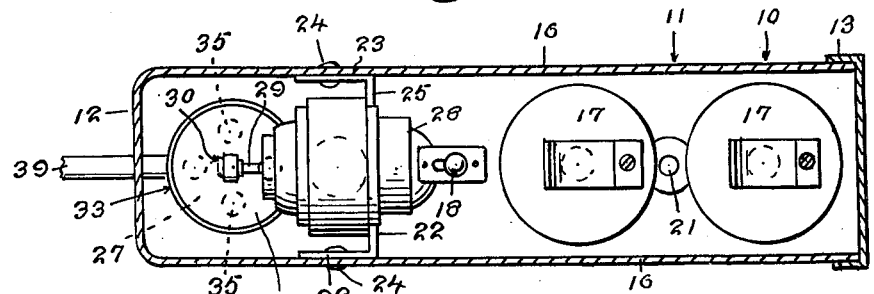
Figure 3 is a sectional view taken on the line 3—3 of Figure 2.
Figure 4:
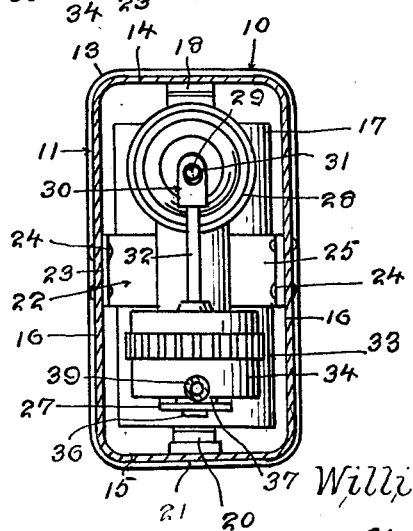
Figure 4 is a sectional view taken on the line 4—4 of Figure 2.

Referring in detail to the drawings, and more particularly to Figures 1-4 of the drawings, there is shown a portable aerator which is indicated generally by the numeral 10, and the aerator 10 includes a hollow housing 11 which is provided with an end wall 12. A closure 13 is removably mounted on an end of the housing 11, as shown in Figure 1. The housing 11 further includes spaced parallel wall members 14 and 15 spaced parallel side walls 16. Positioned in the housing 11 are batteries 17, and supported by the wall member 14 is a manually operable switch 18, there being suitable electric wires 19 connected to the switch 18 and batteries 17. The numeral 20 indicates a contact member which engages the batteries 17, and the contact member 20 may be secured in place by means of a securing element 21.

Mounted in the housing 11 is a bracket 22, and the bracket 22 includes a first pair of spaced parallel portions 23 which are secured to the side walls 16 by suitable securing elements 24. Extending between the first portions 23 is a second portion 25, and a third portion 26 extends from the portion 25. The portion 26 terminates in a fourth portion 27, Figure 2, and the portion 27 is arranged at right angles with respect to the portion 26.

Also mounted in the housing 11 is a conventional electric motor 28 of small size, and a shaft 29 is driven by the motor 28. A coupling 30 is operatably connected to the drive shaft 29 by means of an eccentric connection 31. A driven shaft 32 is secured to the block or coupling 30, and the shaft 32 is adapted to actuate or operate a conventional pump 33. The air pump 33 includes a casing 34 which is provided with a plurality of air inlet openings 35, Figure 3. The numeral 36 indicates a suitable securing element such as a screw which is adapted to be used for connecting the pump 33 to the portion 27 of the bracket 22. A spacer member 37 is positioned between the portion 27 and the adjacent end of the casing 34 whereby there will be sufficient clearance or space for air to enter the casing 34 through the openings 35. The adjacent portion of the housing 11 is adapted to be provided with openings or apertures 38 whereby air can enter the interior of the housing and then pass through the openings 35 so that this air can be pumped out through a conduit 39 which extends through an opening 40 in the end wall 12 of the housing. The conduit 39 has a body member 41 connected thereto, and the body member 41 may be made of any suitable material, and the body member 41 is adapted to have the air pass therethrough and the body member 41 is adapted to be positioned in the container of water being aerated whereby the bait, fish, minnows or the like can be supplied with the necessary quantity of air or oxygen to keep the bait or fish alive.

Referring to Figures 5 and 6 of the drawings, there is shown a modified portable aerator which is indicated generally by the numeral 42, and the aerator 42 includes a hollow housing 43 which resembles a flashlight casing or housing. The housing 43 thus includes a portion 44 of reduced size and a portion 45 of increased size. A closure 46 is mounted on an end of the housing 43, and the closure 46 has a spring member 47 arranged thereagainst, there being batteries 17 positioned within the housing 43. The enlarged portion 45 of the housing 43 is adapted to have a mechanism or apparatus which is substantially the same as the mechanism described in connection with the previous embodiment of Figures 1-4. Thus, there is provided in the portion 45 of the housing 43 a motor 28, which serves to operate an air pump 33 through the medium of the eccentric coupling 30 and shaft 32. Extending from the bracket 42 is a collar 55 which has a support member 56 arranged in engagement therewith, and the support member 56 abuts the adjacent end of the battery 17 as shown in Figure 6.

A cover member 48 is detachably mounted on the portion 45 of the housing 43, and the cover member 48 is provided with an opening 49 through which extends the air outlet conduit 39. Openings 50 may be provided in the portion 45 of the housing 43 whereby air can pass through these openings 50 and then into the corresponding openings in the casing of the pump 33. Supporting pieces 51 may be secured within the housing 43 for helping to support the various parts of the device. As shown in Figure 6, a manually operable switch 52 is adapted to move into and out of engagement with a contact mechanism 53 whereby the electrical circuit to the motor 28 can be selectively completed through the wires 54.

From the foregoing, it is apparent that there has been provided a portable aerator which is adapted to be used for supplying oxygen or air to a container such as a container which has water with minnows, fish, bait or the like therein. With the parts arranged as shown in Figures 1-4 for example, it will be seen that the body member 41 may be immersed in a container of water having live fish or bait therein, and then the switch 18 can be actuated so as to complete the circuit from the batteries 17 to the motor 28. This causes actuation of the motor 28 which in turn rotates the shaft 29, and as the shaft 29 rotates, it moves the driven shaft 32 through the medium of the eccentric coupling 30. As the shaft 32 moves, it serves to actuate the conventional pump 33 whereby air will be sucked in through the openings 38 and this air will enter the casing 34 of the pump 33 through the openings 35. This air will then be pumped out through the conduit 39 and the air will then leave the body member 41 and enter the water so that the desired or required amount of oxygen or air can be supplied to the fish in the water whereby the fish or bait can be kept alive for long periods of time so that for example when a fisherman requires or needs bait, a ready quantity or supply of live bait is available. When the device is not being used, the switch 18 can be moved to "off" position so that the effective life of the batteries 17 can be prolonged. The device is self-container so that no outside source of electrical energy is required, and the device is adapted to be made small and compact so that it can be readily carried from place to place as desired.

In the modification shown in Figures 5 and 6, instead of having the rectangular housing which was previously described, the housing 43 is adapted to be used, and the housing 43 has the shape of a flashlight casing or housing. The batteries 17 are arranged in end to end relation as shown in Figure 6, and these batteries 17 supply electrical energy through the wires 54 to the motor 28 when the switch 52 is actuated. This causes the pump 33 to be operated whereby air will be pumped out through the conduit 39 and through a body member such as the body member 41 so that this air can be used for aerating water containing bait, fish, or the like.

In the event that the batteries should become worn out, the closures on the ends of the housing can be readily removed whereby new or fresh batteries can be readily inserted therein. The parts can be made of any suitable material and in different shapes or sizes. The pump 33 is of the type that operates on a short stroke so that a constant flow of air is supplied. The pump may be of the diaphragm type. The spacer member 37 provides sufficient clearance between the portion 27 and openings 35 so that the intake air can pass into the openings 35. The pump 33 is adapted to be retained in place by means of the screw 36. Suitable insulation can be used wherever required or desired. The batteries are of standard size and are of conventional construction. The bracket 22 serves to mount the motor and pump as one unit or assembly, and the body member 41 may be made of sandstone or the like which is attached to the end of the discharge hose or conduit 39, and the member 41 serves to break up the air into small bubbles so as to properly aerate the water. The number of batteries used can be varied as desired. The member 48 may include a plastic or sheet metal covering for enclosing the pump assembly and associated parts.

Heretofore fishermen have experienced difficulty in keeping minnows alive on lengthy fishing trips since minnows have a tendency to die due to lack of oxygen in the water and this is especially true when the container is over-crowded with minnows since the minnows quickly use up the supply of oxygen in the water. According to the present invention there is provided a portable aerator which will overcome this problem and the aerator can be carried in a tackle box or in a person's pocket. When the portable aerator is being operated, the sandstone or body member 41 can be mounted on the end of the discharge conduit 39 in such a manner that the member 41 can be placed in the minnow bucket and then the switch is turned on. While the device is being used, it may be placed on a boat seat, on the bottom of a boat, or it may be hung on the side of a minnow bucket. The device will operate continuously for long periods of time. However, it is not necessary to operate the aerator for more than 15 or 20 minutes in every hour and usually it is not necessary to aerate the water except in the hottest part of the day or when the minnow bucket is over-crowded. The portable aerator can be built in different sizes by using proper motor and battery combinations and the parts can be adjusted or arranged so that the desired quantity of air can be supplied.

I claim:

A portable aerator comprising a hollow housing including spaced parallel side walls, a plurality of batteries positioned within said housing, a manually operable switch electrically connected to said batteries, a bracket secured within said housing and including a first pair of spaced parallel portions secured to the side walls of said housing, a second portion of said bracket being arranged at right angles with respect to said first portions and extending therebetween, a third portion extending from said second portion, said third portion terminating in a right angularly arranged fourth portion, a permanent magnet electric rotary motor positioned in said housing and electrically connected to said batteries and switch, a drive shaft operated by said motor, an eccentric coupling connected to the outer end of said shaft, a driven shaft extending from said coupling, a diaphragm pump supported on the fourth portion of said bracket and said pump being actuated by said driven shaft, said pump including a casing provided with inlet openings for the entrance of air, a spacer member interposed between said casing and fourth portion so as to provide clearance whereby air can enter the casing through the openings therein, a conduit extending from said pump and projecting through the housing, and a sandstone body member on the end of said conduit.

References Cited in the file of this patent

UNITED STATES PATENTS

| | | |
|---|---|---|
| 2,172,799 | Magnus | Sept. 12, 1939 |
| 2,429,441 | Williams | Oct. 21, 1947 |
| 2,598,211 | Beliaeff | May 27, 1952 |
| 2,601,198 | Willson | June 17, 1952 |
| 2,639,906 | Butler | May 26, 1953 |
| 2,676,921 | Vansteenkiste | Apr. 27, 1954 |
| 2,808,196 | Williams | Oct. 1, 1957 |